Feb. 28, 1928. 1,661,149
O. L. BARNEBEY
PROCESS FOR TREATING GASES
Filed Jan. 21, 1925
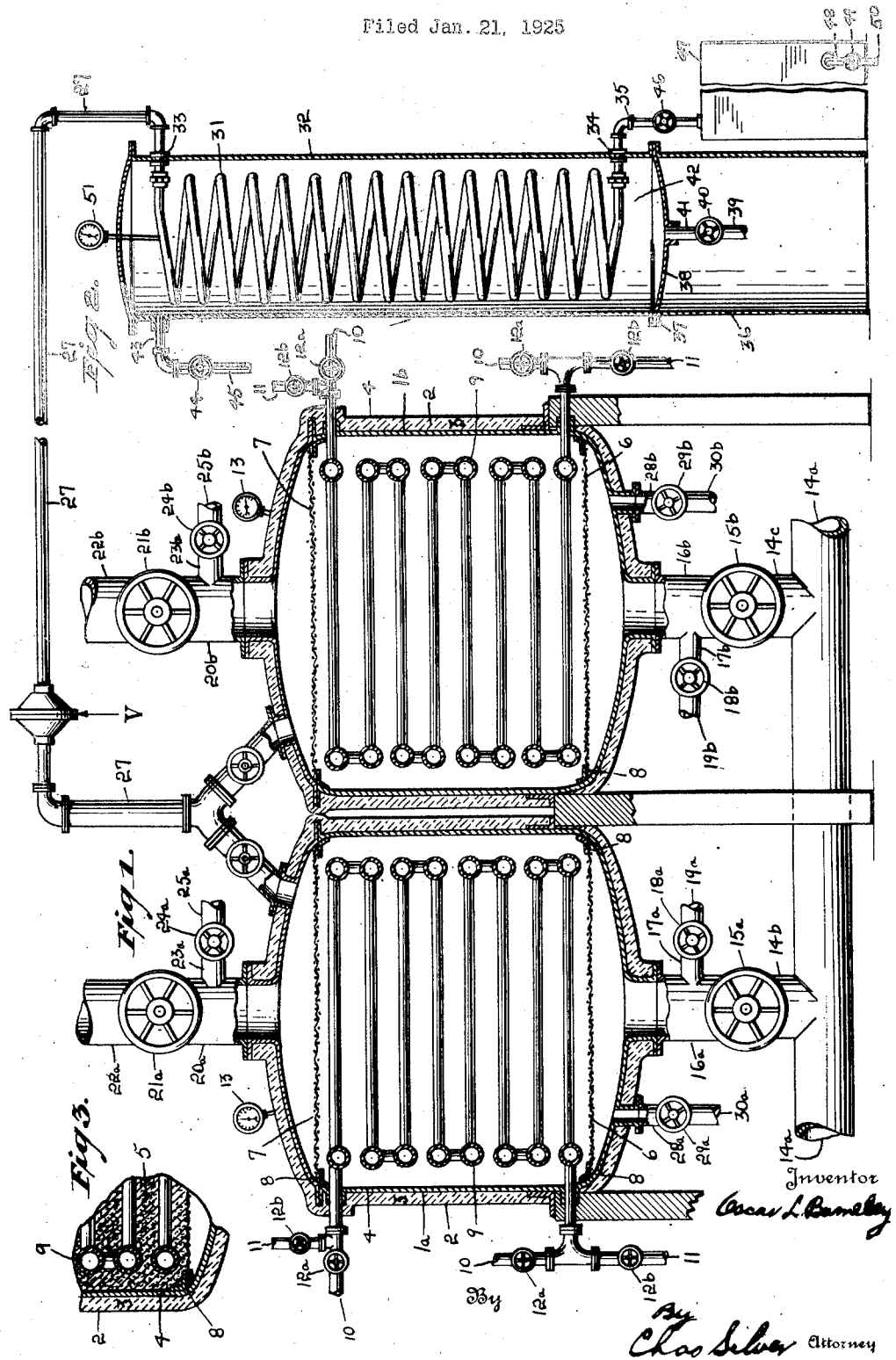

Patented Feb. 28, 1928.

1,661,149

UNITED STATES PATENT OFFICE.

OSCAR L. BARNEBEY, OF COLUMBUS, OHIO, ASSIGNOR TO AMERICAN SOLVENT RECOVERY CORPORATION, A CORPORATION OF OHIO.

PROCESS FOR TREATING GASES.

Application filed January 21, 1925. Serial No. 3,878.

The present invention relates to a process for concentrating and liquefying gases wherein a gas is adsorbed by activated charcoal and then separated therefrom, collected and condensed, and has for one of its objects a method which can be economically and efficiently carried out at a minimum cost of operation. Other objects will readily appear to those skilled in the art upon reference to the following description and claims:

In this discovery the gas which is to be concentrated or recovered is adsorbed in activated carbon. Activated carbon is carbon or carbon containing material which has been given a special treatment to make it more active as an adsorbent than the original carbon or carbon containing material. One of the best treatments to activate carbon is to heat the carbon or carbon containing material for an extended period of time at temperatures above 700° C. in the presence of steam, the time being inversely proportional to the temperature. The activated carbon so produced is then used to adsorb the gas to be recovered or concentrated. After the activated carbon has been essentially saturated with the adsorbable gas then the carbon and contained gas is heated. The heating causes the gas to be driven out of the activated carbon and such evolved gas is then condensed. In many cases I prefer to evolve the gas by the application of heat and utilize the pressure caused by evolution of the gas within a closed system which is cooled sufficiently to liquefy the gas. In other cases, however, I cool the condenser and condense without the use of pressure.

Activated carbon has the capacity to adsorb large quantities of many gases amenable to this treatment. In general it may be stated that the lower the temperature the greater the adsorption and vice versa, the higher the temperature of activated charcoal the less the adsorption. In ordinary cases activated charcoal will take up very large quantities of many gases or vapors at ordinary room temperature. Sometimes, however, in order to bring about a practical recovery of certain gases and vapors I have found that cooling the charcoal is highly desirable. The activated charcoal adsorbs gases with great force. The intense attraction is manifested by the liberation of much heat and I have found it necessary in many cases to remove this heat of adsorption. I have found that unless the heat is removed the charcoal becomes very warm, in fact so warm that at the increased temperature thus produced, the charcoal no longer takes up as much gas as it otherwise should.

In the usual case of the separation and recovery of gases, water cooling is sufficient to remove the heat of adsorption to give a practical operation of the system and effect an economical recovery of the adsorbable gases. However, there are cases in which water cooling is not adequate and much more intense cooling must be supplied. The degree of artificial cooling supplied depends upon the particular requirement. Sometimes I prefer to pass ice water through the coils embedded in the activated charcoal in order to accomplished my purposes. In many cases, however, this is not sufficient cooling and a salt brine which has been artificially cooled is used.

In certain cases, particularly when recovering or separating gases of low boiling points and which have relatively high vapor pressure at ordinary temperatures it is necessary to cool with such a medium as direct expansion of liquid ammonia, in which cases the ammonia is expanded directly in the coils which are embedded in the activated charcoal.

With very low boiling point liquids requiring very low temperatures in cooling the activated charcoal for best results it is sometimes necessary to cool by expanding liquid air. I have found that these lower temperatures not only increase the adsorbable value of the charcoal, thus giving increased capacity to the activated charcoal, but in some cases this type of cooling is absolutely necessary to accomplish in full the separation completely, particularly with low boiling point gases. On the other hand, cooling the activated charcoal to very low temperature imparts to the activated charcoal the property of complete adsorption of adsorbable from unadsorbable gases and makes possible a complete separation which otherwise would not be the case.

In some instances while the activated charcoal when cooled to approximately atmospheric temperatures gives a practical recovery result, that is to say, gives a high yield of adsorbable constituents, yet in some cases in practical operation small amounts of the adsorbable gases are allowed to pass thru the activated charcoal unadsorbed, thus contaminating the unadsorbable gases and when a very complete separation is desired in such cases such may be frequently accomplished by cooling the activated charcoal to very low temperatures as above described, even cooling the activated charcoal down to the temperature produced by the expansion of liquid air.

Frequently also in this case pressure applied to gases being treated is used to supplement the extreme cooling, such being found to be of advantage and highly desirable in some cases. When I cool to very low temperature I also cool the gaseous mixture before it enters the activated charcoal to more easily maintain the desired low temperature within the activated charcoal.

First the carbon is partially or wholly saturated with the particular gas to be recovered or concentrated, using the appropriate temperature, depending upon the specific character of the gas to be concentrated or recovered. After the adsorption is complete or sufficiently so for the purpose at hand the activated carbon is heated or allowed to become warm if the temperature is already below room temperature. The amount of heat applied and the rate of applying it is dependent upon the rate of evolution of gas desired. The evolved gas is caused to enter a cooling chamber or condenser which is cooled by the appropriate means, either using cold water, ice, circulating salt brine which is cooled by any refrigeration method in common use. Still further, the condenser may be cooled by the expansion of liquefied or compressed gases such as air, ammonia, sulphur dioxide, etc.; in fact, cooled by any of the regular refrigerating gases constituting conventional cooling practice.

Sometimes I prefer to supplement cooling with compression and in this relation may use a mechanical compressor such as a piston pump or utilize the compression produced by rapidly evolved gases as they are forced from the charcoal by the application of heat. The amount of cooling and compressing may vary within large limits, the desired temperature or pressure being different for different cases. Generally speaking, I employ only cooling to condense gases or vapors having low vapor pressure at ordinary temperatures whereas I prefer to use compression with vapors of relatively high vapor pressure at ordinary temperatures.

There are two phases of this invention to be considered, the first phase consisting in the concentrating of gases in which case the adsorbable gases are separated from the gases which are not adsorbable and the second phase which deals with the recovery of adsorbable gases and vapors from unadsorbable gases and obtaining the adsorbable gases and vapors in a condensed or liquid form.

I shall first consider the concentration or separation of adsorbable gases or vapors from unadsorbable gases. In this case, the mixture of gases containing both adsorbable and unadsorbable gases or vapors is passed thru a body of activated carbon, meantime cooling the activated carbon as required. Sometimes it is desirable to cool the gas mixture before contacting the same with the activated carbon. As the mixture of gases come in contact with the activated carbon the activated carbon takes up the adsorbable constituents and allows the unadsorbable constituents to pass. These unadsorbable constituents are then vented and conducted away from the body of activated charcoal to any desired place. The mixture of gases is passed thru the body of activated charcoal until the charcoal is essentially saturated with the adsorbable constituents, at the end of which time the intake of gases is closed by valves appropriately arranged and the exit is likewise shut off by means of valves and the mixture of gases passed through another body of charcoal of similar character in order to make the process continuous. The charcoal is then heated in any convenient manner and most preferably by means of steam directly into the charcoal when dealing with adsorbable gases or vapors which are not decomposed by steam. This heating is supplemented with heating by means of heating coils embedded in the activated carbon. Regardless of the method of applying heat a sufficient quantity of heat must be supplied to overcome the tremendous affinity or attraction which the activated charcoal has for adsorbent constituents.

While the heating continues the distillate consisting of the evolved gases and vapors which had previously been adsorbed and some steam when such is added directly to the activated charcoal is vented thru appropriate piping and valved to a condenser which is appropriately cooled, the amount of cooling depending upon the vapor pressure of the evolved gases and vapors. The cooling condenses the excess of steam and allows the gases to pass thru the condenser. When steam is not used directly but applied thru means of heating coils the only purpose of the cooler is to cool the evolved gases. If cooling is not specifically required I allow the gases to cool gradually to room temperature without using special cooling means. In such cases the evolved gases are not passed through the cooler. The separated gases or vapors are then conducted to point of storage or use. By following this phase of my invention I separate adsorbable from unadsorbable gases and obtain the separated gases as products.

I shall now consider the second phase of my invention. In this case, the mixture of gases containing adsorbable and unadsorbable gases or vapors is treated in such a manner as to recover the adsorbable gases or vapors from the unadsorbable gases and obtain the adsorbable gases and vapors in the liquid form.

In the process the unadsorbable gases are ordinarily left in the gaseous form. However, such can be liquefied by compression and cooling when desired.

The process in this phase of the invention is essentially like the first phase in manner of separating the adsorbable and unadsorbable gases in that in this case likewise the mixture of gases is contacted with a body of activated charcoal and the activated charcoal subtracts from the mixture the adsorbable and allows the unadsorbable gases to pass thru the body of activated charcoal. The unadsorbable gases in this case also are vented or are conducted to any point of use. Sometimes it is desirable to concentrate or even liquefy the unadsorbable gases and this is accomplished by mechanical pressure and cooling or by use of cooling alone. The amount of cooling and the amount of pressure applied in each case depends upon the boiling point and vapor pressure of the particular gas or mixture of gases.

Considering the gases adsorbed by the activated charcoal and thus separated from the unadsorbable gases I remove the adsorbed gases and vapors by applying heat directly or indirectly or by both direct and indirect application of heat. Usually when I apply heat directly I do so by injecting steam directly to the charcoal and when I apply heat indirectly I ordinarily do so by heating with steam coils. While other heating means may be employed I have found that steam heating is the most practical in the usual cases. In some instances I prefer to evacuate using a vacuum pump and when using vacuo I usually also heat the activated charcoal at the same time to evolve the gases more rapidly. The evolved gases are passed to a condenser which is appropriately cooled in order to liquefy the gases or vapors being recovered. When the removal of the gases from the charcoal is being accomplished by aid of vacuum I ordinarily exhaust from the vacuum pump under pressure so that the gases are compressed within the condenser, thus lowering the tendency to vaporization and increasing the capacity of the condenser. In many cases the use of the compression within the condenser allows me to use cooling means very much more efficiently. For instance, with certain boiling point liquids without pressure I would be required to use a cold salt brine or a refrigerating system to obtain a sufficiently low temperature to cause liquefaction of the gas being recovered. However, by compressing the gas within the condenser I am enabled to use cooling water as it can be obtained from an ordinary water system or from a well to accomplish my purposes. When the vapor pressure of the liquid being recovered is rather low no compression is used or if any is used a slight pressure as a matter of convenience to increase the capacity of the condenser is sufficient.

The liquid is then removed from the condenser to any point of storage or use and the operation is thus completed, having obtained the adsorbable gas finally in a liquid form and the unadsorbable gas either as in the gaseous form or in the form of liquid in special cases.

After the adsorbed gases and vapors have been distilled from the activated carbon, the carbon is cooled and used again to receive more gaseous mixture thus becoming again saturated with adsorbable gas. The activated charcoal is again distilled, etc., the process being made continuous. By having two more bodies of charcoal one body is separating adsorbable from unadsorbable gas, another similar body of activated charcoal is being distilled, and still another body of activated charcoal is being cooled in preparation for again receiving gaseous mixtures for another separation. The steps are repeated again and again in endless series thus giving continuous performance.

The invention is further explained by the detailed description of the acompanying drawings in which the parts are identified by the reference characters.

Figure I is an elevation with parts of the apparatus illustrated in cross sections and other parts broken away to show the internal structure, Figure II is an elevated and perspective view partly in cross section of the condenser, Figure III is an enlarged view of a portion of the supporting screen used in Figure I to support the activated carbon.

Referring to Figures I to III inclusive, the towers 1$^a$ and 1$^b$ are surrounded by insulation material 2 which is within a space 3 within the casing 4. The activated carbonaceous material 5 is supported in the tower by the double supporting screens 6 shown in plan in Figure 3. Supporting screens 7 are also placed in the tops of the towers above the activated carbonaceous material. The two screens 6 and 7 are held in place by the special screen supports 8. The internal heating coil system 9 serves to give a rapid transfer of heat away from the carbonaceous material when the latter is adsorbing gases and to transfer the heat to the activated carbonaceous material when gases are being expelled from the same during the distillation period.

The entrance pipes 10 are used to conduct steam, usually under pressure of water to the coil systems 9 and the exits 11 are used to exit water condensate from the coil systems during the heating period and warm water during cooling period. Steam is caused to enter the top of coil systems and cooling water enters at bottom of the coils to give best results. The values $12^a$ and $12^b$ are used to regulate the intake and exit correspondingly.

During the cooling period the same intakes and exits and the corresponding valves are used to introduce and control the flow of cooling media. The gauges 13 indicate the pressure within the towers at all times.

$14^a$ is the intake gas manifold which supplies the gas mixture to the towers. T's $14^b$ and $14^c$ convey the gas from the manifold thru valves $15^a$ and $15^b$ to the towers through the pipes $16^a$ and $16^b$. Into pipe $16^a$ is attached connection $17^a$ with its valve $18^a$ and intake connection $19^a$, and to $16^b$ correspondingly is attached $17^b$ with its valve $18^b$ and intake connection $19^b$, these connections serving to introduce steam for the distillation.

Exit pipes $20^a$ and $20^b$ are used to discharge the unadsorbed gases from the towers. Valves $21^a$ and $21^b$ control the direction of flow of the unadsorbed gases and connections $22^a$ and $22^b$ lead the unadsorbed gases to the desired place of use or discharge.

To $20^a$, $20^b$ are attached pipe connections $23^a$, $23^b$ with their valves $24^a$, $24^b$ and exterior connections $25^a$, $25^b$ which are used for passage of distillate when it is not desired to run the distillate to the condenser. Pipe connections $28^a$, $28^b$ with valves $29^a$, $29^b$ and exterior connections $30^a$, $30^b$ are used to drain any condensed water from the towers. During the steam distillation period, distillate passing through pipe system 27 enters the cooling coil 31 which is contained within the condenser jacket 32. Pipe 27 is connected at 33 to the cooling coil 31, and exits through connection 34 and pipe connection 35. Cooler jacket 32 is supported by base 36, the same being attached at 37 to the jacket and to the bottom of the condenser 38, the three metal pieces being firmly riveted or bolted together. When it is desired to employ a vacuum for aiding the removal of the gases evolved from the activated carbon, a vacuum pump V is inserted in the pipe 27 and it is preferable to have the vacuum pump exhaust under pressure.

Water enters the condenser through connection 39 and valvular control 40 and passes through pipe 41 directly into the condenser pipe 42, passing upward in contact with coil 31 and exiting through pipe 43, valvular control 44 and exterior connection 45. When other cooling medium is used instead of water the medium is passed thru the condenser in much the same manner. The liquid condensed within the coil 31 passes out through pipe 35 through valve 46 to storage condenser 47 and from the storage container the liquid is withdrawn through 48 with its valve 49 and exterior pipe connection 50. Instead of using a single coil sometimes I prefer to use a multiple number of coils and fasten each coil to a manifold, the manifold number of coils being positioned within the same condenser usually for sake of economy although each can be placed in its own condenser jacket and operate as a single unit. I sometimes prefer to place insulation material on the outside of cooler jacket 32 to conserve heat in much the same manner as described for insulation on the outside of the towers such as described at insulation 2 within the space 3.

The gauge 51 indicates the pressure within the condenser at any time.

The general operation of the process using this equipment is as follows:

The towers $1^a$ and $1^b$ are filled with activated carbonaceous material. One of the towers, let us say any tower $1^a$, is first saturated with gas to be separated by passing the mixture of gases through manifold $14^a$ and into tower $1^a$ by opening valve $15^a$. In the meantime valve $15^b$ is closed. Valve $21^b$ is opened allowing the unadsorbed gas to pass out through $22^b$. The unadsorbed gas is vented or conducted to point of use or storage. When desired the unadsorbed gas is liquefied by cooling or by combination of cooling and compression. Meantime cooling means is passed through coil 9 by opening the appropriate valves $12^a$ and $12^b$.

When the tower $1^a$ is saturated with the gas being adsorbed valves $15^a$ and $21^a$ are closed and valves $15^b$ and $21^b$ are opened, thus allowing the gaseous mixture to enter tower $1^b$ and unadsorbed gas to exit at $22^b$. While tower $1^b$ is being saturated tower $1^a$ is being distilled. For distillation purposes steam is passed through coil 9 of tower $1^a$ by changing the valves $12^a$ and $12^b$ in such a manner as to shut off the supply of water which was used for cooling and to allow steam to enter the top part of the coil system 9 and condensate to exit from the bottom through corresponding valves $12^a$ and $12^b$. Steam is likewise introduced direct into the charcoal in some cases through $19^a$ and valve $18^a$ and pipe $17^a$.

With all of the other valves closed, valve $26^c$ is opened and the distillate is passed to the condenser 32 by passing the vapors through pipe line 27 to the coil condenser 31 of the condenser. Cooling means enters the condenser through pipe 39 with its valve 40 and intake to the condenser 41 and the warm water exits through pipe 43 with its valve 44 and extended connection 45. The condensate is passed through pipe line 35 with valve 46 open into condenser 47 in which the condensate is allowed to accumulate for the length of time desired after which it is removed through pipe line 48 with its valve 49 and exit at pipe 50 to any place desired. Sometimes the flow of distillate is made continuous from the condenser to the storage space.

Distillation is continued until the previously adsorbed gas has been substantially removed after which valve 26ª is closed and water again passed through the coil system to cool the activated carbonaceous material, after which tower 1ª is again ready to receive gaseous mixture as before. Tower 1ᵇ is functioned the same as tower 1ª.

After it has been saturated with adsorbed gas it is distilled in the same manner as described for 1ª and then the activated carbonaceous material is cooled when it is ready for readsorbing more adsorbable gases, etc., in a continuous cycle. By using two or more towers the process is made continuous. At least one tower is adsorbing while one or more towers are being distilled and cooled, there being no interruption of the flow of gas to the towers and separation of the adsorbable and unadsorbable constituents.

The drawings and detailed description illustrate only one form of my invention and the invention is not limited specifically to the same, since my process is amenable to many variations and modifications which will be evident to those skilled in this art. Consequently this invention is to be construed as limited only in accordance with the following claims.

It should be noted that whenever in the appended claims the expression "activated carbon" is used, it is intended that this expression shall cover only carbonaceous material or carbon which has been subjected to a high temperature in excess of 700° C. in the presence of activating gases such as steam, carbon dioxide and others, and has thereby acquired high adsorption power for gases and vapors.

This application is a division in part of my co-pending applications Ser. No. 348,901, filed Jan. 2, 1920 and Ser. No. 397,745, filed July 20, 1920.

I claim as my invention:

1. In a process of separating gases, passing a gaseous mixture into activated carbon and removing the adsorbable portion from said gaseous mixture by the activated carbon while allowing the unadsorbable portion to pass, expelling the adsorbed portion from the activated carbon by means of indirect heat applied to the interior of the body of activated carbon carrying the adsorbed gaseous material, cooling and collecting the gaseous matter thus expelled.

2. In a process of separating gases, passing a gaseous mixture into activated carbon and removing the adsorbable portion from said gaseous mixture by the activated carbon while allowing the unadsorbable portion to pass, expelling the adsorbed portion from the activated carbon by means of indirect heat applied to the interior of the body of activated carbon, and liquefying the gaseous matter thus expelled with the aid of cooling.

3. In a process of separating gases, passing a gaseous mixture into activated carbon and removing the adsorbable portion from said gaseous mixture by the activated carbon while allowing the unadsorbable portion to pass, expelling the adsorbed portion from the activated carbon by heating same, removing the expelled gaseous matter by force of vacuum and then collecting same.

4. In a process of separating gases, passing a gaseous mixture into activated carbon and removing the adsorbable portion from said gaseous mixture by the activated carbon while allowing the unadsorbable portion to pass, expelling the adsorbed portion from the activated carbon by heating same, removing the expelled gaseous matter by force of vacuum while simultaneously compressing same, with the aid of cooling and liquefying the same.

5. In a process of separating gases, passing a gaseous mixture into activated carbon and removing the adsorbable portion from said gaseous mixture by the activated carbon while allowing the unadsorbable portion to pass, expelling the adsorbed portion from the activated carbon by means of indirect heat applied to the interior of the body of activated carbon, removing the expelled gaseous matter by force of vacuum while simultaneously compressing same, and then liquefying the same with the aid of cooling.

6. In a process of separating gases, passing a gaseous mixture into activated carbon and removing the adsorbable portion from said gaseous mixture by the activated carbon while allowing the unadsorbable portion to pass, liquefying the unadsorbable gaseous portion with the aid of cooling, expelling the adsorbed portion from the activated carbon by means of indirect heat applied to the interior of the body of activated carbon carrying the adsorbed gaseous material, and liquefying the gaseous matter thus expelled with the aid of cooling and compressing.

7. In a process of separating gases, passing a gaseous mixture into activated carbon and removing the adsorbable portion from said gaseous mixture by the activated carbon while allowing the unadsorbable portion to pass, liquefying the unadsorbable gaseous portion with the aid of cooling and compressing, expelling the adsorbed portion from the activated carbon by means of indirect heat applied to the interior of the body of activated carbon carrying the adsorbed gaseous material, and liquefying the gaseous matter thus expelled with the aid of cooling and compressing.

8. In a process of separating gases, passing a gaseous mixture into activated carbon cooled substantially below atmospheric temperature and removing the adsorbable portion from said gaseous mixture by the activated carbon while allowing the unadsorbable portion to pass, expelling the adsorbed portion from the activated carbon by means of indirect heat applied to the interior of the body of activated carbon carrying the adsorbed gaseous material, cooling and collecting the gaseous matter thus expelled.

9. In a process of separating gases, passing a gaseous mixture into activated carbon cooled substantially below atmospheric temperature and removing the adsorbable portion from said gaseous mixture by the activated carbon while allowing the unadsorbable portion to pass, expelling the adsorbed portion from the activated carbon by heating same, removing the expelled gaseous matter by force of vacuum and then collecting same.

10. In a process of separating gases, passing a gaseous mixture into activated carbon cooled substantially below atmospheric temperature and removing the adsorbable portion from said gaseous mixture by the activated carbon while allowing the unadsorbable portion to pass, expelling the adsorbed portion from the activated carbon by heating same, removing the expelled gaseous matter by force of vacuum while simultaneously compressing same, and liquefying the same with the aid of cooling.

11. In a process of separating gases, passing a gaseous mixture into activated carbon cooled substantially below atmospheric temperature and removing the adsorbable portion from said gaseous mixture by the activated carbon while allowing the unadsorbable portion to pass liquefying the unadsorbable gaseous portion with the aid of cooling, expelling the adsorbed portion from the activated carbon by means of indirect heat applied to the interior of the body of activated carbon carrying the adsorbed gaseous material, and liquefying the gaseous matter thus expelled with the aid of cooling and compressing.

12. In a process of separating gases, passing a gaseous mixture into activated carbon cooled substantially below atmospheric temperature and removing the adsorbable portion from said gaseous mixture by the activated carbon while allowing the unadsorbable portion to pass, liquefying the unadsorbable gaseous portion with the aid of cooling and compressing, expelling the adsorbed portion from the activated carbon by means of indirect heat applied to the interior of the body of activated carbon carrying the adsorbed gaseous material, and liquefying the gaseous matter thus expelled with the aid of cooling and compressing.

In testimony whereof, I hereunto affix my signature.

OSCAR L. BARNEBEY.